(12) United States Patent
Naitoh

(10) Patent No.: US 7,257,841 B2
(45) Date of Patent: Aug. 14, 2007

(54) COMPUTER VIRUS INFECTION INFORMATION PROVIDING METHOD, COMPUTER VIRUS INFECTION INFORMATION PROVIDING SYSTEM, INFECTION INFORMATION PROVIDING APPARATUS, AND COMPUTER MEMORY PRODUCT

(75) Inventor: Hisao Naitoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 627 days.

(21) Appl. No.: 09/902,583

(22) Filed: Jul. 12, 2001

(65) Prior Publication Data

US 2002/0138760 A1    Sep. 26, 2002

(30) Foreign Application Priority Data

Mar. 26, 2001  (JP) .............................. 2001-088710

(51) Int. Cl.
  *G06F 12/14* (2006.01)
  *G08B 23/00* (2006.01)
(52) U.S. Cl. ............................. 726/24; 726/22; 726/23
(58) Field of Classification Search ................ 713/200, 713/201, 202; 726/24, 22, 23
  See application file for complete search history.

(56) References Cited

U.S. PATENT DOCUMENTS

| | | | | |
|---|---|---|---|---|
| 5,953,502 A * | 9/1999 | Helbig, Sr. | .................. | 726/24 |
| 5,991,881 A * | 11/1999 | Conklin et al. | ................ | 726/22 |
| 6,021,510 A * | 2/2000 | Nachenberg | ................. | 714/38 |
| 6,230,288 B1 * | 5/2001 | Kuo et al. | ..................... | 714/38 |
| 6,785,732 B1 * | 8/2004 | Bates et al. | ................. | 709/232 |
| 6,983,486 B1 * | 1/2006 | Hanchett | ..................... | 726/22 |
| 2002/0116639 A1 * | 8/2002 | Chefalas et al. | ........... | 713/201 |
| 2002/0129277 A1 * | 9/2002 | Caccavale | .................. | 713/201 |
| 2003/0191957 A1 * | 10/2003 | Hypponen et al. | ......... | 713/200 |
| 2004/0230827 A1 * | 11/2004 | Franczek et al. | .......... | 713/200 |

FOREIGN PATENT DOCUMENTS

JP    11-102333    4/1999

OTHER PUBLICATIONS

Japanese Office Action dated Mar. 8, 2005 for corresponding Application No. 2001-088710.
Office Action for corresponding Japanese Application No. 2001-088710 dated Jun. 16, 2005.

* cited by examiner

*Primary Examiner*—Ayaz Sheikh
*Assistant Examiner*—Kaveh Abrishamkar
(74) *Attorney, Agent, or Firm*—Staas & Halsey LLP

(57) ABSTRACT

The present invention provides a computer virus infection information providing system for providing infection information such as the time of infection to the users and thereby permitting the users to understand the time of infection easily. Anti-virus software is installed in a central apparatus. The central apparatus further stores the communication history of the information transmitted by terminal apparatuses. When the installed anti-virus software detects a computer virus in the transmitted information, the time of infection is specified based on the stored communication history. The infection information including the specified time of infection is transmitted to a terminal apparatus. The terminal apparatus displays the transmitted infection information including the time of infection.

9 Claims, 19 Drawing Sheets

FIG. 3

ANTI-VIRUS SOFTWARE INSTALLATION FILE ~151

| ANTI-VIRUS SOFTWARE CODE | TIME OF FIND-OUT OF THE COMPUTER VIRUS | TIME OF INSTALLATION OF THE ANTI-VIRUS SOFTWARE |
|---|---|---|
| 0001 | 2001/1/10 | 2001/1/14 |
| 0002 | 2001/1/30 | 2001/2/1 |
| 0003 | 2001/2/15 | 2001/2/18 |
| ⋮ | ⋮ | ⋮ |

FIG. 4

| USER FILE 153 | | | |
|---|---|---|---|
| LOG-IN NAME | PASSWORD | E-MAIL ADDRESS | NAME OF PERSON |
| 2001 | **** | 2001@ISP.com | ○×△× |
| 2002 | **** | 2002@ISP.com | ××△○ |
| 2003 | **** | 2003@ISP.com | △△△△ |
| ⋮ | ⋮ | ⋮ | ⋮ |

FIG. 5

COMMUNICATION HISTORY STORAGE FILE / 152

LOG-IN NAME | 2001 | 2002 | 2003 | ...

| TIME TRANSMITTED INFORMATION | ANTI-VIRUS SOFTWARE CODE | DETECTED COMPUTER VIRUS |
|---|---|---|
| 2001/1/20 10:30:50 | 0003 | × |
| 2001/1/21 13:20:15 | 0003 | × |
| 2001/1/30 20:10:15 | 0003 | × |
| 2001/2/3 10:15:10 | 0003 | Vireu |
| ... | ... | ... |

FIG. 9

| USER FILE 153 | | | | |
|---|---|---|---|---|
| LOG-IN NAME | PASSWORD | E-MAIL ADDRESS | NAME OF PERSON | ANTI-VIRUS SOFTWARE REGISTRATION |
| 2001 | **** | 2001@ISP.com | ○×△× | ○ |
| 2002 | **** | 2002@ISP.com | ××△○ | ○ |
| 2003 | **** | 2003@ISP.com | △△△△ | × |
| ... | ... | ... | ... | ... |

FIG. 11

EXECUTION HISTORY FILE 251

| TIME OF EXECUTION | EXECUTION RESULT | ANTI-VIRUS SOFTWARE CODE | DETECTED COMPUTER VIRUS NAME |
|---|---|---|---|
| 2001/1/2 12:25:13 | × | 0003 | — |
| 2001/1/5 16:10:35 | × | 0003 | — |
| 2001/1/7 2:10:15 | × | 0003 | — |
| 2001/1/15 12:12:45 | ○ | 0003 | Vireu |
| ... | ... | ... | ... |

FIG. 13

Warning of computer virus infection

File "sample.xls" which you have transmitted at 10:15:10 am on February/03/2001 is infected with virus "vireu." Accordingly, file transmission was interrupted. Please remove the virus using anti-virus software before re-transmission.

The data of your usage in our ISP indicates that the infection occurred between 10:15:10 of January/03/2001 and 10:15:10 of February/03/2001 via a removable disk, such as a CD and MO, or alternatively via a network other than our ISP. Virus check for your computer is earnestly recommended in order to prevent the spreading-out of the computer virus.

When you wish a higher virus resistance for your computer, recommended is [The Local Virus Scan Management Service] supported by us. During the access to our ISP, virus information is automatically updated. Your computer is protected from the infection via all the routes even other than our ISP. This additional service needs an additional charge. See this page in detail.

FIG. 14

Warning of computer virus infection

Our virus monitoring system has detected the infection of this computer with a computer virus. The computer virus has been removed immediately.

For the purpose of the removal of computer virus, transmission of the following e-mail was interrupted. Please re-transmit it.

The virus is named "Vireu." The data indicates that the infection occurred between 02:10:15 of January/07/2001 and 12:12:45 of January /15/2001 via a removable disk, such as a CD and an MO, or alternatively via a network other than our ISP.

---Text of e-mail is below---

COMPUTER VIRUS INFECTION INFORMATION PROVIDING METHOD, COMPUTER VIRUS INFECTION INFORMATION PROVIDING SYSTEM, INFECTION INFORMATION PROVIDING APPARATUS, AND COMPUTER MEMORY PRODUCT

BACKGROUND OF THE INVENTION

1. Field of the Invention

The present invention relates to a computer virus infection information providing system for detecting a computer virus in information transmitted between a terminal apparatus and a central apparatus and providing infection information concerning the detected computer virus, and in particular, to a computer virus infection information providing system for providing the time of the infection and route of infection as infection information and thereby providing information on how the user terminal apparatus was infected with the computer virus.

2. Description of the Prior Art

In recent years, computer viruses which invade computers from the Internet or computer memory products such as floppy disks and prevent normal operation of the computers intentionally are spreading. These computer viruses infect not only an initially infected computer but also the other computers. Thus, when a computer virus of new kind is found out, an appropriate anti-virus software is prepared immediately. The anti-virus software is distributed to users.

The anti-virus software is generally installed on user terminal apparatuses. Each terminal apparatus performs virus check every predetermined time interval or every time of file operation. As the result of virus check, the terminal apparatus detects the computer virus.

Further, recently, there is computer virus that attaches the computer virus as the attached file of an e-mail transmitted via the Internet, and distributes the attached file to the third party indiscriminatingly. In order to treat such computer viruses, an Internet service provider (ISP, hereafter) installs anti-virus software in a central apparatus. Then, the central apparatus performs virus check on the files passing through the network, thereby blocking the further infection of the computer virus.

However, in the prior art, even when the central apparatus has detected the presence of a computer virus in the information transmitted by a user, the user is merely informed of the detection of the computer virus. This leaves the problem that the user cannot understand when and from where the computer virus invaded his or her terminal apparatus. In particular, considering the increasing number of cases of infection via the Internet, it is desired to provide detailed infection information to the users.

Further, it is effective that anti-virus software of the latest version is installed also in user terminal apparatuses in addition to the central apparatus of the ISP. However, after initial installation of anti-virus software prepared by anti-virus software house, only a few users update the anti-virus software. This causes the problem of inefficiency in removing computer viruses.

Furthermore, development of anti-virus software needs a large cost. Nevertheless, ordinary users are not willing to pay for the update of the anti-virus software after initial installation of the anti-virus software. Such a situation has exacerbated the profitability of anti-virus software houses.

In addition, each ISP desires superiority to the other ISP's and a higher added value. For the purpose of this, ISP's have desired to construct a system for providing detailed computer virus infection information to the users. Further, ISP's have desired to construct a system for distributing the latest version of anti-virus software to each user and for collecting the development cost of the anti-virus software.

BRIEF SUMMARY OF THE INVENTION

The present invention was implemented in view of the above circumstances.

A first object of the invention is to provide a computer virus infection information providing system in which a central apparatus monitors the communication history of the user terminal apparatuses and provides infection information such as the time of infection to the users, whereby the users can easily understand the time of infection, and whereby an ISP can obtain a high added value.

A second object of the invention is to provide a computer virus infection information providing system in which both the time of find-out of a computer virus and the time of installation of anti-virus software are taken into consideration, whereby the time of infection can be specified more precisely.

A third object of the invention is to provide a computer virus infection information providing system for providing also the information on the route of computer virus infection and thereby permitting easier determination of the cause of computer virus infection.

A fourth object of the invention is to provide a computer virus infection information providing system for distributing anti-virus software only to predetermined users and thereby permitting reliable collection of the development cost of the anti-virus software.

A fifth object of the invention is to provide a computer virus infection information providing system in which user terminal apparatuses also perform virus check, whereby the time of infection is specified based on the result, whereby the specified time of infection is provided as the infection information to the users, and whereby the precision in time of infection is improved.

A sixth object of the invention is to provide a computer virus infection information providing system for providing the advertising information concerning anti-virus software to those users not yet having the anti-virus software and thereby promoting the sale of the anti-virus software.

In the present invention, anti-virus software for detecting computer viruses is installed in a central apparatus (infection information providing apparatus). The central apparatus stores the communication history of the information transmitted from the terminal apparatuses connected via a communication network. When the installed anti-virus software detects a computer virus in the transmitted information, the central apparatus specifies the time of infection based on the stored communication history.

The central apparatus stores the time data transmitting the information as the communication history. In the following description, assumed is the case that no computer virus was detected when a terminal apparatus transmitted information at the previous time, but that a computer virus is detected when the terminal apparatus transmitted information at the present time. In this case, the time of infection is specified to be between the time when the terminal apparatus transmitted information at the previous time and the time when the terminal apparatus transmitted information at the present time. Further, the route of infection is specified to be a route via another ISP or a computer memory product. The central apparatus transmits the infection information including the specified time of infection, to the terminal apparatus. The transmitted contents include the time of infection and the name of the computer virus of infection.

The terminal apparatus displays the transmitted infection information including the time of infection. This gives detailed computer virus information to the user. Further, the user can easily specify the cause of infection.

In particular, by providing the detailed infection information, the ISP can obtain superiority to the other ISP's and a considerably high added value.

Further, in the present invention, the time when the anti-virus software house or the ISP found out the computer virus is taken into consideration in order to specify the time of infection. That is, computer viruses gradually spread out after the first find-out. Accordingly, user terminal apparatuses are rarely infected with a computer virus before the find-out of the computer virus. In other words, the time of infection is rarely before the find-out of the computer virus.

Furthermore, the time when the anti-virus software against the found-out computer virus was installed in the central apparatus is taken into consideration in order to specify the time of infection. That is, after the anti-virus software was installed in the central apparatus, the computer virus is completely blocked in the route via the central apparatus.

Accordingly, when a computer virus is detected, the possibility of the time of infection critically depends on whether the time of the previous information transmission is before or after the installation of the anti-virus software. In case that the time of the previous information transmission is after the installation of the anti-virus software, it is concluded that there was no infection with the computer virus at the previous time. Thus, the infection is specified to have occurred between the time of the previous information transmission and the time of the present information transmission, via another ISP or a computer memory product.

On the other hand, in case that the time of the previous information transmission is before the installation of the anti-virus software, the time of infection is specified to be between the time of find-out of the computer virus and the time of the present information transmission As such, in the present invention, in addition to the communication history, both the time of find-out of a computer virus and the time of installation of anti-virus software are taken into consideration in order to determine the precise time of infection. Consequently, in accordance with the present invention, the time of infection can be specified more precisely. Further, the user can specify the cause of infection more easily.

Further, in the present invention, the route of infection of a computer virus is specified based on both the stored communication history and the time of installation of anti-virus software. That is, in case that no computer virus was detected when a terminal apparatus transmitted information at the previous time after the installation of the anti-virus software in a central apparatus, but that a computer virus is detected when the terminal apparatus transmitted information at the present time, rejected is the possibility that the terminal apparatus was infected via the central apparatus (the ISP in question). (That is, the terminal apparatus was infected via another ISP or the like.)

On the other hand, in case that a computer virus is detected when the terminal apparatus transmitted information at the present time after the installation of the anti-virus software in the central apparatus, and that the time when the terminal apparatus transmitted information at the previous time was before the installation, there remains the possibility that the terminal apparatus was infected via the central apparatus (the ISP in question) before the installation.

As such, in the invention, the route of infection of a computer virus is specified based on both the communication history and the time of installation of anti-virus software. In the present invention, the route of infection also is provided as the infection information to the user, thereby permitting the user to obtain more useful information.

Further, in the present invention, a central apparatus transmits the anti-virus software only to predetermined terminal apparatuses. In each terminal apparatus having received the anti-virus software, the anti-virus software is installed. The anti-virus software is executed every predetermined time interval, every time of file operation, or at another timing, thereby storing the execution history. When the anti-virus software detects a computer virus, the terminal apparatus transmits the stored execution history to the central apparatus.

The central apparatus specifies the time of infection based on the execution history and the stored time of find-out. The central apparatus further specifies the route of infection based on the transmitted execution history. That is, similarly to the above-mentioned method, virus check is carried out also in the local terminal apparatuses, whereby the information such as execution history is collected. The central apparatus specifies the time and route of infection based on such information, thereby providing the result to the users.

Accordingly, those users previously having a license contract to be provided with the latest versions of the anti-virus software can efficiently prevent the infection of computer viruses. Further, in the present invention, the time of infection is specified based on the result of computer virus check performed in the local terminal apparatuses. Accordingly, the time and route of infection can be specified in further detail. Furthermore, since the ISP can make a license contract with each user, the present invention permits reliable collection of the development cost of the anti-virus software. Thus, a routine revenue is anticipated every time of occurrence of a computer virus. This situation provides a solid ground for the operation of the anti-virus software house.

Further, in the present invention, advertising information concerning anti-virus software is transmitted to terminal apparatuses. Such advertising information is provided to those users not yet having a license contract for the anti-virus software, whereby the number of users having the license contract can be increased.

The above and further objects and futures of the invention will more fully be apparent from the following detailed description with accompanying drawings.

BRIEF DESCRIPTION OF THE SEVERAL VIEWS OF THE DRAWINGS

FIG. 3 is a diagram showing the record layout of anti-virus software installation file;

FIG. 4 is a diagram showing the record layout of a user file;

FIG. 5 is a diagram showing the record layout of a communication history storage file;

FIG. 9 is a diagram showing the record layout of a user file according to Embodiment 2;

FIG. 11 is a diagram showing the record contents of an execution history file;

FIG. 13 is a diagram showing an illustration of advertising information;

FIG. 14 is a diagram showing the contents of infection information displayed on a display section;

DESCRIPTION OF THE PREFERRED EMBODIMENTS

Embodiment 1

Figure 1:
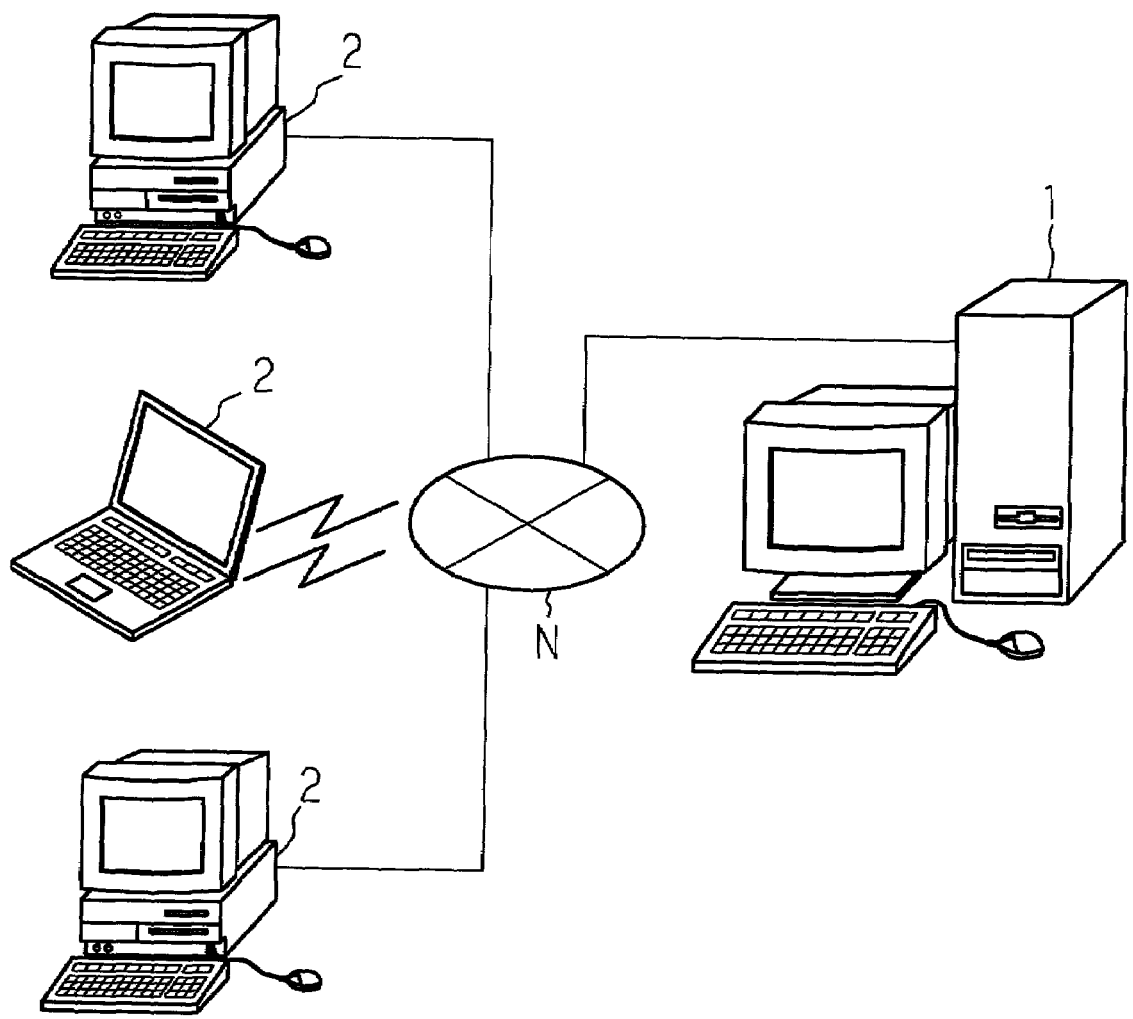
FIG. 1 is a schematic diagram showing the general configuration of a computer virus infection information providing system according to the invention.

FIG. 1 is a schematic diagram showing the general configuration of a computer virus infection information providing system according to the invention. In the figure, numeral 1 indicates a central apparatus (this is an infection information providing apparatus, but simply referred to as a central apparatus hereafter) of an ISP or the like which provides Internet connection services.

Central apparatus 1 is connected through a communication network N, such as the Internet, to terminal apparatuses 2, 2, 2, . . . such as personal computers and portable terminal apparatuses. Each terminal apparatus 2 is provided with a log-in name, an e-mail address, and the like after a contract with the ISP. By accessing a predetermined access point, terminal apparatus 2 can net-surf and transmit/receive e-mails via central apparatus 1.

The present embodiment is described for a system in which central apparatus 1 of the ISP and terminal apparatus 2 in each home are interconnected via the Internet. However, the invention is not restricted to this case, and may be applied to a system in which a central apparatus 1 of server computer or the like and each terminal apparatus 2 of client computer or the like are interconnected via a LAN (local area network) of a company or the like.

Figure 2:
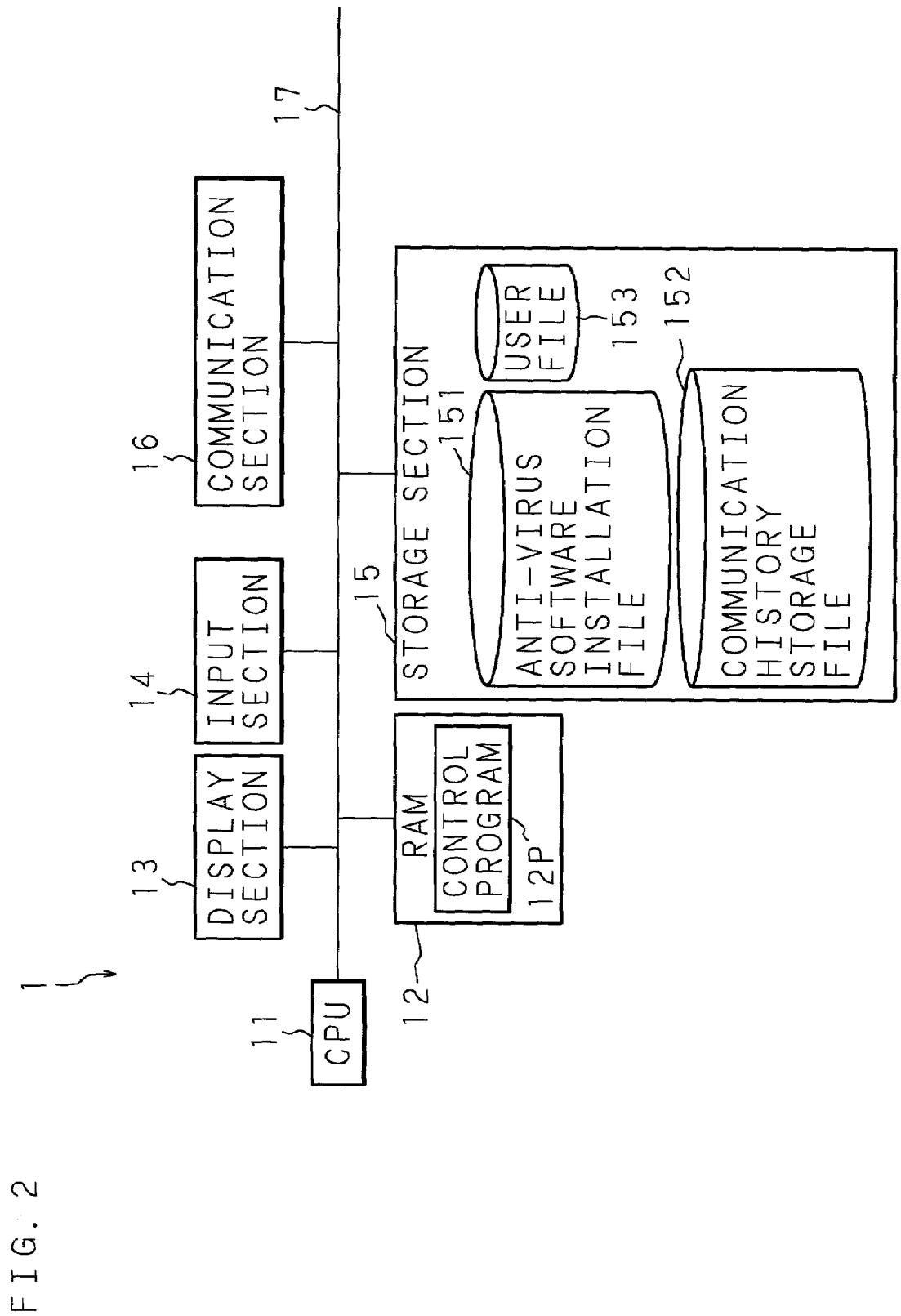
FIG. 2 is block diagram showing the configuration of a central apparatus.

FIG. 2 is block diagram showing the configuration of a central apparatus 1. As shown in the figure, a CPU 11 is connected through a bus 17 to: a RAM 12; a storage section 15 such as a hard disk drive; a communication section 16 such as a gateway for transmitting and receiving information to and from terminal apparatuses 2; a display section 13 such as a liquid crystal display; and an input section 14 such as a keyboard and a mouse. RAM 12 stores a control program 12P for controlling storage section 15, display section 13, input section 14, and the like.

Storage section 15 comprises: anti-virus software installation file 151 for installing a prepared anti-virus software; a communication history storage file 152 for storing the communication history of terminal apparatuses 2; and a user file 153 for storing the log-in name, e-mail address, and the like of the users. Here, it is not definitely necessary for these anti-virus software installation file 151, communication history storage file 152, and user file 153 to be installed in the storage section 15 of the central apparatus 1. These files may be installed in another and unshown computer connected via the communication network N, and may be read out when necessary.

When information is transmitted from terminal apparatus 2 to the central apparatus 1, CPU 11 stores the communication history into communication history storage file 152. When an e-mail having an attached file passes through communication section 16 such as a gateway, CPU 11 performs computer virus detection using the anti-virus software installed in anti-virus software installation file 151. Here, each anti-virus software according to the invention has the function of detecting computer viruses. Further, the anti-virus software according to the invention may have the function of removing the computer viruses in addition to the function of detection.

FIG. 3 is a diagram showing the record layout of anti-virus software installation file 151. As shown in the figure, the time of find-out of the computer virus and the time of installation of the anti-virus software for detecting and removing the computer virus are stored corresponding to each anti-virus software code for specifying each anti-virus software. Although not shown, anti-virus software is also installed in anti-virus software installation file 151 corresponding to each anti-virus software code. Every time when a new computer virus is found out, the function of detecting and removing the computer virus is added to the anti-virus software.

FIG. 4 is a diagram showing the record layout of user file 153. As shown in the figure, a password, an e-mail address, and a name of person are stored corresponding to each proper log-in name assigned to each user for log-in to the central apparatus 1.

FIG. 5 is a diagram showing the record layout of communication history storage file 152. As shown in the figure, communication history is stored for each terminal apparatus 2, that is to say each user log-in name. In the communication history storage file 152, anti-virus software code and a detected computer virus are stored when each terminal apparatus 2 transmits information. The anti-virus software code field stores the anti-virus software code of the anti-virus software installed in central apparatus 1 at the time of information transmission. When the anti-virus software is executed and detects a computer virus, the detected virus name is stored in the anti-virus software code field. When the anti-virus software is executed but detects no computer virus, information (a cross mark in the figure) indicating no detection is stored in the anti-virus software code field.

Figure 6:
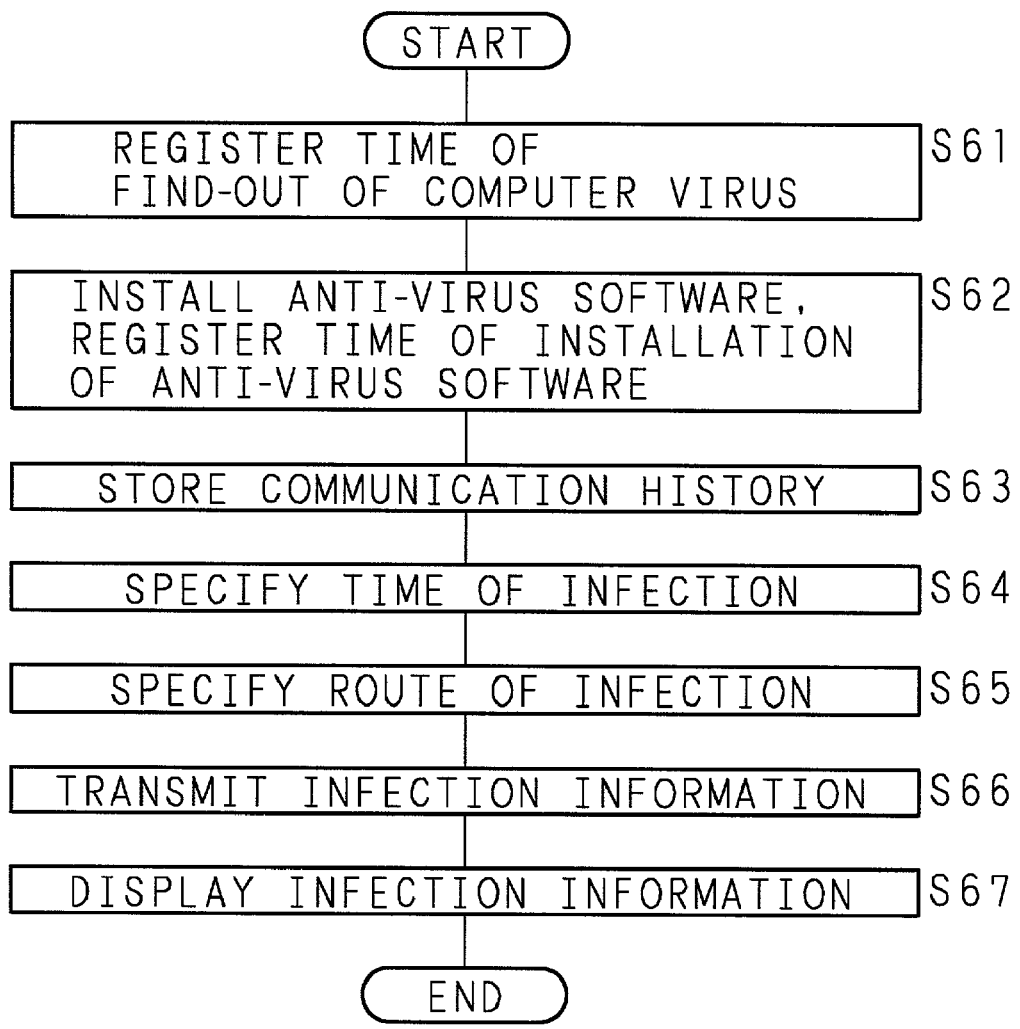
FIG. 6 is a flow chart showing the process sequence of a computer virus infection information providing system according to the invention.

FIG. 6 is a flow chart showing the process sequence of the computer virus infection information providing system according to the invention. When a new computer virus is found out, central apparatus 1 stores the time of find-out into anti-virus software installation file 151 (step S61). When anti-virus software for detecting and removing the found-out computer virus is prepared, central apparatus 1 installs the anti-virus software on anti-virus software installation file 151 (step S62). Central apparatus 1 further stores the time of installation of the anti-virus software corresponding to the anti-virus software (step S62).

In the anti-virus software installation file 151, the time of find-out of the computer virus, the time of installation of the anti-virus software, and the anti-virus software (not shown) are stored corresponding to a proper anti-virus software code for specifying the anti-virus software as shown in FIG. 3. It should be noted that the time interval necessary to prepare the anti-virus software causes an inevitable time lag in the time of installation of the anti-virus software from the time of find-out of the computer virus.

Central apparatus 1 further stores the communication history of each terminal apparatus 2 into the communication history storage file 152 (step S63). More specifically, central apparatus 1 stores the time when terminal apparatus 2 transmitted information to central apparatus 1 and other information corresponding to the log-in name as shown in FIG. 5. Further, central apparatus 1 may store a log-in time and a log-out time as the communication history.

When terminal apparatus 2 transmits information via central apparatus 1, central apparatus 1 determines the presence or absence of a computer virus in the information by using the installed anti-virus software. When a computer virus is detected, central apparatus 1 specifies the time of infection of terminal apparatus 2 with the computer virus based on the communication history and the like (step S64). Central apparatus 1 further specifies the route of infection (step S65). The detailed process sequence of specifying the time and route of infection is described later.

Central apparatus 1 transmits computer virus infection information including the specified time and route of infection, the detected computer virus name, and the method of treatment, and the like, to terminal apparatus 2 with reference to the e-mail address stored in user file 153 (step S66). Terminal apparatus 2 displays the transmitted infection information onto the unshown display section 13 such as a liquid crystal display (step S67). The contents of the display is described later.

Figure 7:
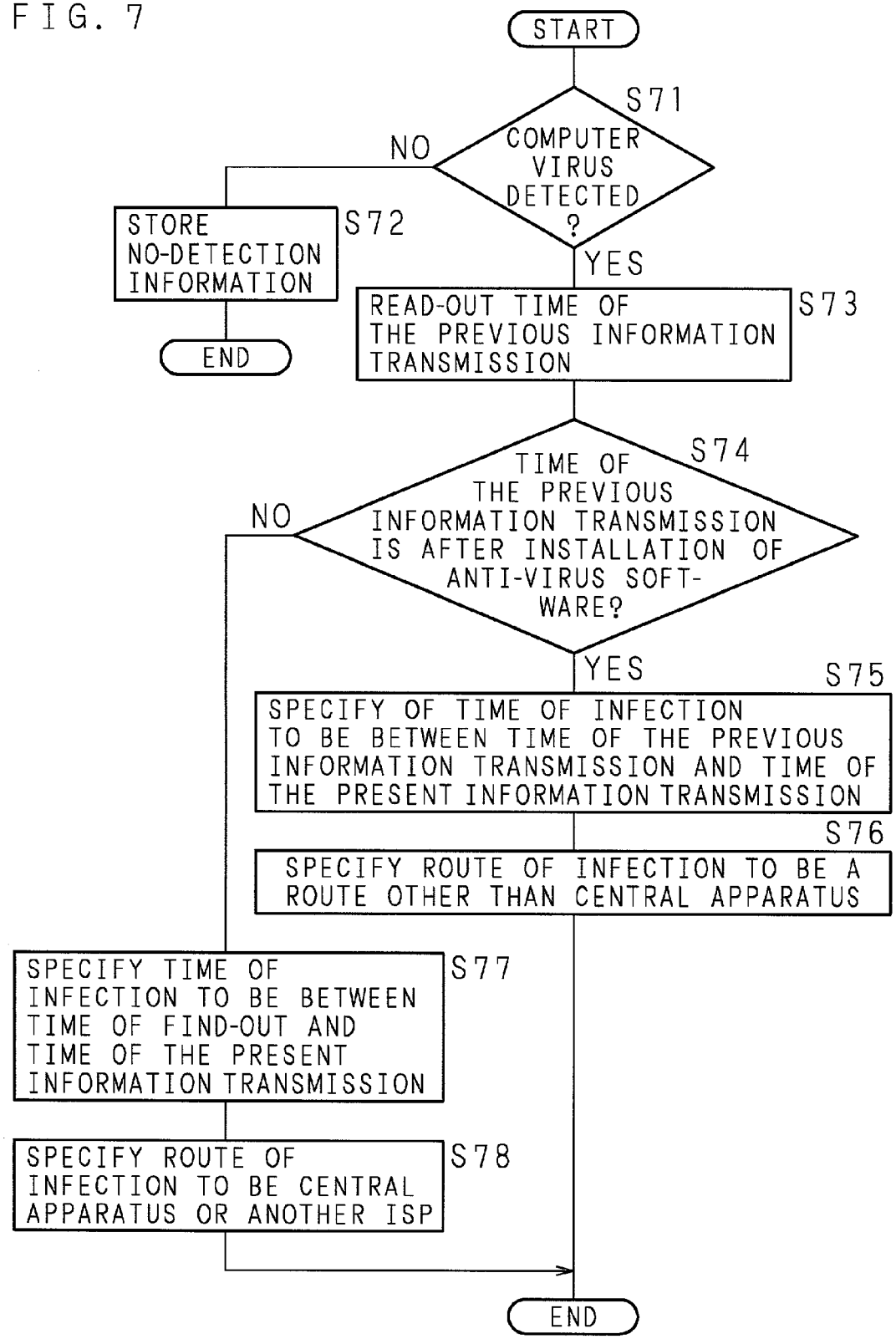
FIG. 7 is a flow chart showing the process sequence of specifying the time of infection and of specifying the route of infection.

FIG. 7 is a flow chart showing the process sequence of specifying the time of infection and of specifying the route of infection. Central apparatus 1 determines the presence or absence of a computer virus in the information transmitted by terminal apparatus 2 (step S71). More specifically, central apparatus 1 uses the latest version of the anti-virus software installed in anti-virus software installation file 151. Then, central apparatus 1 determines whether the file contains a computer virus or not by performing matching process and the like onto the file name or the file contents of the transmitted file.

When no computer virus is detected (NO in step S71), central apparatus 1 stores the information indicating no detection into the detected computer virus field of communication history storage file 152 (step S72). In FIG. 5, this information is shown by a cross mark in the detected computer virus field. Central apparatus 1 further stores the anti-virus software code of the anti-virus software used in the computer virus check into the anti-virus software code field.

When a computer virus is detected (YES in step S71), central apparatus 1 refers to communication history storage file 152, thereby reading out the time of the previous information transmission (step S73). Then, central apparatus 1 also stores the detected computer virus name into the detected computer virus field corresponding to the time of the present information transmission as shown in FIG. 5.

Next, central apparatus 1 refers to anti-virus software installation file 151, thereby reading out the time of installation of the anti-virus software. Central apparatus 1 then compares the time of the previous information transmission with the time of installation of the anti-virus software, thereby determining whether the time of the previous information transmission is before or after the installation of the anti-virus software (step S74).

In case that the time of the previous information transmission is after the installation of the anti-virus software (YES in step S74), central apparatus 1 specifies the time of infection to be between the time of the previous information transmission and the time of installation of the anti-virus software (step S75).

Further, central apparatus 1 specifies the route of infection to be a route other than central apparatus 1 (other than the ISP which owns central apparatus 1) (step S76).

That is, after the anti-virus software was installed in central apparatus 1, computer viruses are completely blocked in the route via the ISP which owns central apparatus 1. The fact that no computer virus was detected in the previously transmitted information under such condition indicates that there was no infection with the computer virus at the time of the previous information transmission.

Then, the additional fact that the computer virus is detected firstly at the present time indicates that the infection has occurred between the time of the previous information transmission and the time of the present information transmission, via another ISP or a computer memory product such as a floppy disk.

Assumed is the case that a computer virus sends out an infective computer virus to each e-mail address stored in the address book of a mailer, and that terminal apparatus 2 is infected with this computer virus via another ISP. Central apparatus 1 detected no computer virus at the time of the previous information transmission. But, central apparatus 1 has detected a computer virus at the time of the present information transmission. Accordingly, the route of infection is specified to be a route via another ISP or a computer memory product such as a floppy disk. Further, the time of infection is specified to be between the time of the previous information transmission and the time of the present information transmission.

In contrast, in case that the time of the previous information transmission is not after the installation of the anti-virus software (NO in step S74), central apparatus 1 specifies the time of infection to be between the time of find-out and the time of detection (step S77). Further, central apparatus 1 specifies the route of infection to be a route via central apparatus 1, another ISP, or a computer memory product (step S78).

Such a case is rare. However, one possibility is that the terminal apparatus 2 was infected at an early stage before the installation of the anti-virus software into central apparatus 1, that is to say before the central apparatus 1 becomes ready to block the computer virus. Further, very rare is the case that the terminal apparatus 2 is infected before the first find-out of the computer virus. Accordingly, in this case, central apparatus 1 specifies the time of infection to be between the time of find-out and the time of the present information transmission. Further, since the possibility can not be rejected that the computer virus has passed through central apparatus 1, central apparatus 1 specifies the route of infection to be a route via central apparatus 1, another ISP, or a computer memory product such as a floppy disk.

When central apparatus 1 has specified the time and route of infection by the above-mentioned process, central apparatus 1 transmits the infection information to terminal apparatus 2.

Figure 8:
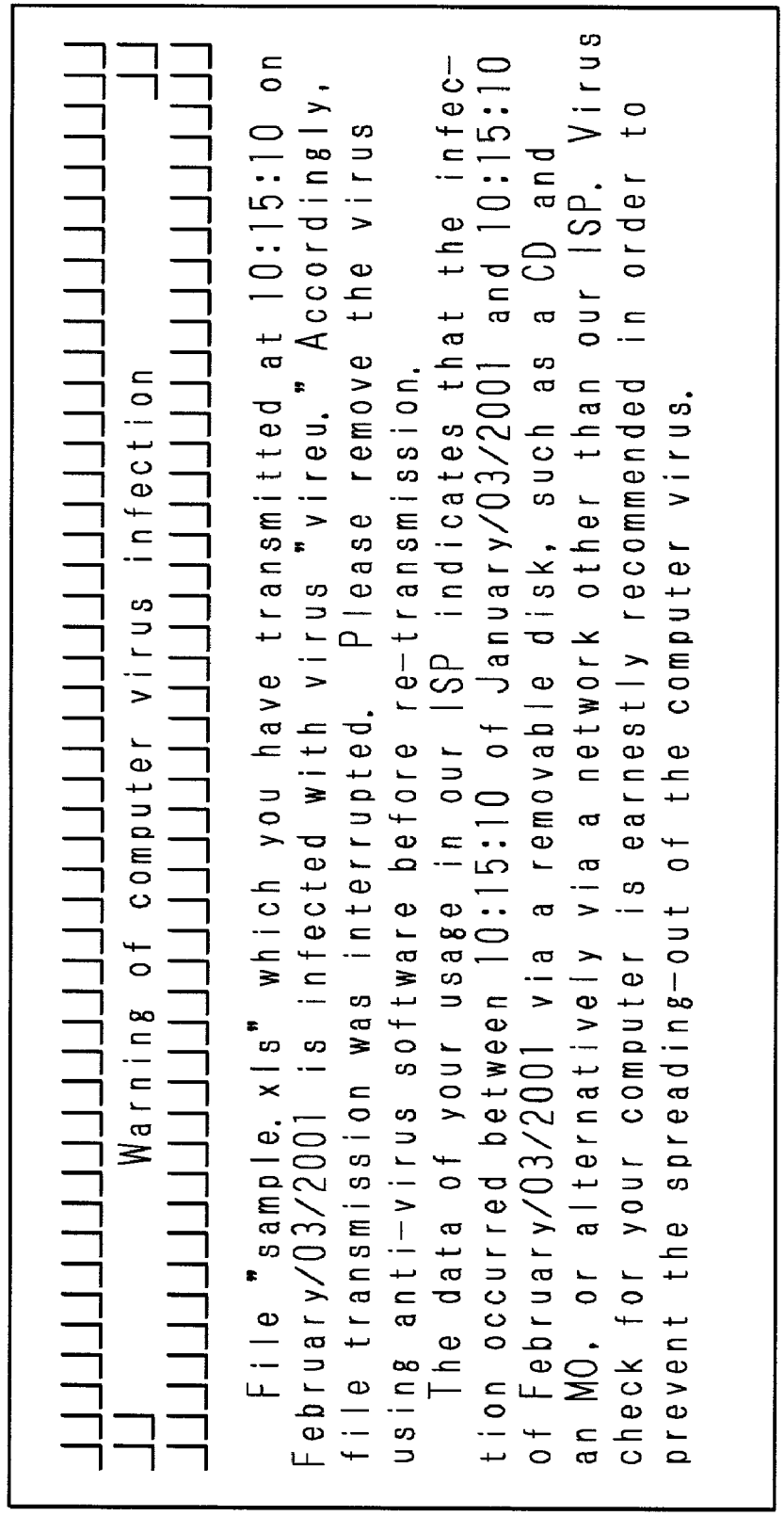
FIG. 8 is a diagram showing an example of the display of infection information.

FIG. 8 is a diagram showing an example the display of the infection information. As shown in FIG. 8, central apparatus 1 transmits the specified time and route of infection as an e-mail. At the same time, central apparatus 1 provides also the detected computer virus name and the method of treatment as a part of the infection information.

Embodiment 2

A central apparatus 1 according to Embodiment 2 provides anti-virus software to predetermined terminal apparatuses 2. Further, central apparatus 1 analyzes the execution result of the anti-virus software, thereby providing more detailed infection information.

FIG. 9 is a diagram showing the record layout of a user file 153 according to Embodiment 2. As shown in FIG. 9, the information indicating whether a registration is done for receiving the anti-virus software or not is stored each anti-virus software registration field. A user already registered is indicated with a circle mark, while a user not yet registered is indicated with a cross mark. In order to receive the anti-virus software, a user needs to pay a predetermined cost to the ISP which operates central apparatus 1. Paying the cost, the user can receive the anti-virus software. The anti-virus software is provided every time when a new computer virus is found out. By virtue of this scheme, the anti-virus software house can reliably collect the development cost of the anti-virus software via the ISP every time when a new computer virus is found out.

Figure 10:
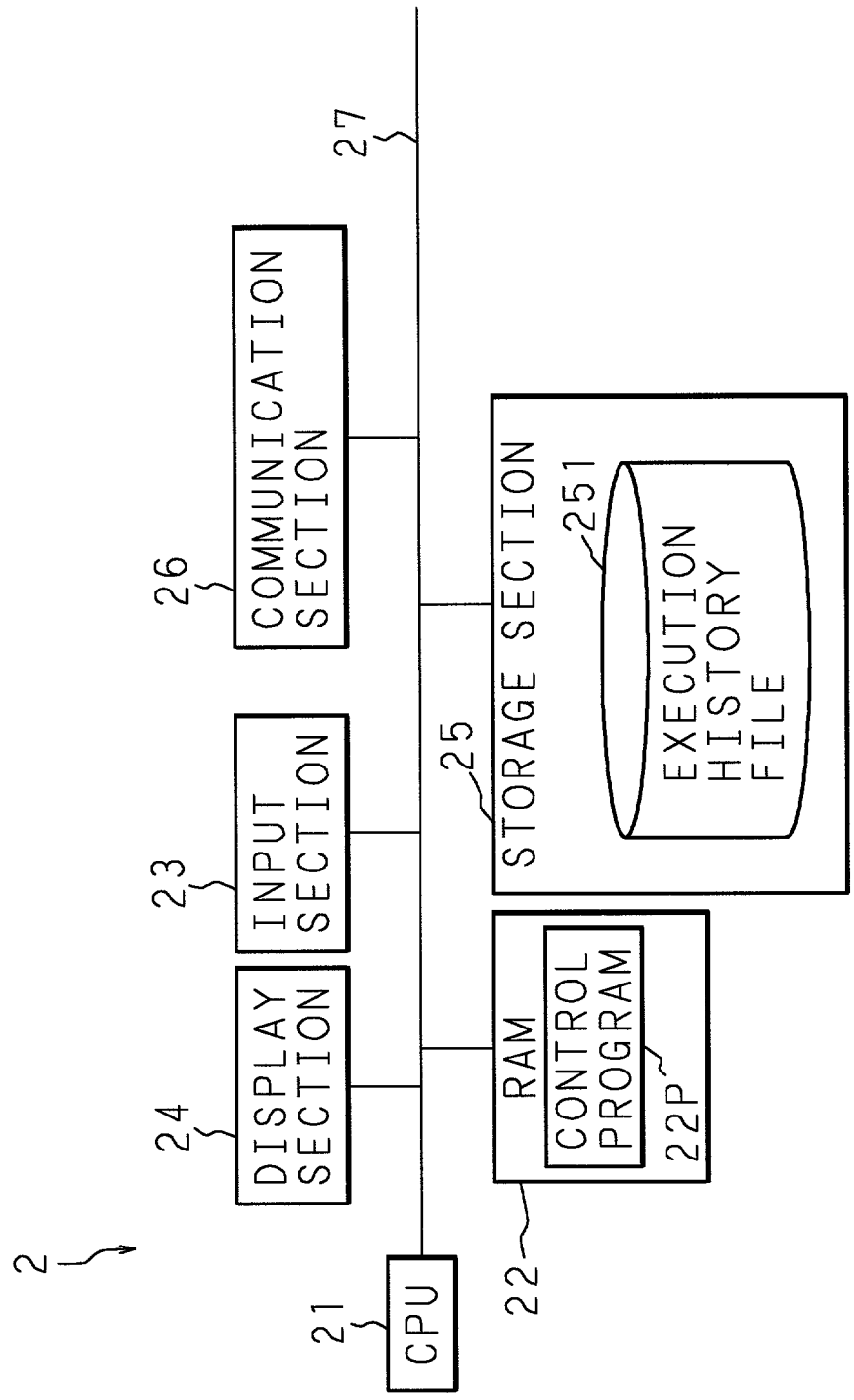
FIG. 10 is block diagram showing the configuration of a terminal apparatus according to Embodiment 2.

FIG. 10 is block diagram showing the configuration of a terminal apparatus 2 according to Embodiment 2. The terminal apparatus 2 according to Embodiment 2 has a configuration similar to that of a well known computer. A CPU 21 is connected through a bus 27 to: a RAM 22; a storage section 25 such as a hard disk drive; a communication section 26 such as a modem for transmitting and receiving information to and from central apparatus 1; a display section 24 such as a liquid crystal display; and an input section 23 such as a keyboard and a mouse. RAM 22 stores a control program 22P for controlling storage section 25, display section 24, input section 23, and the like.

Storage section 25 stores anti-virus software down-loaded from central apparatus 1. The anti-virus software is loaded up to RAM 22, thereby detecting computer viruses. The execution result is stored in an execution history file 251.

FIG. 11 is a diagram showing the record contents of execution history file 251. As shown in the figure, the execution result, the executed anti-virus software code, and the detected computer virus name are stored correspondingly to each time of execution of the anti-virus software. When a computer virus is detected at the time of execution of the anti-virus software, a flag (a circle mark in the figure) is stored in execution result field. Further, the detected computer virus name is stored in detected computer virus field stores.

Figure 12A:
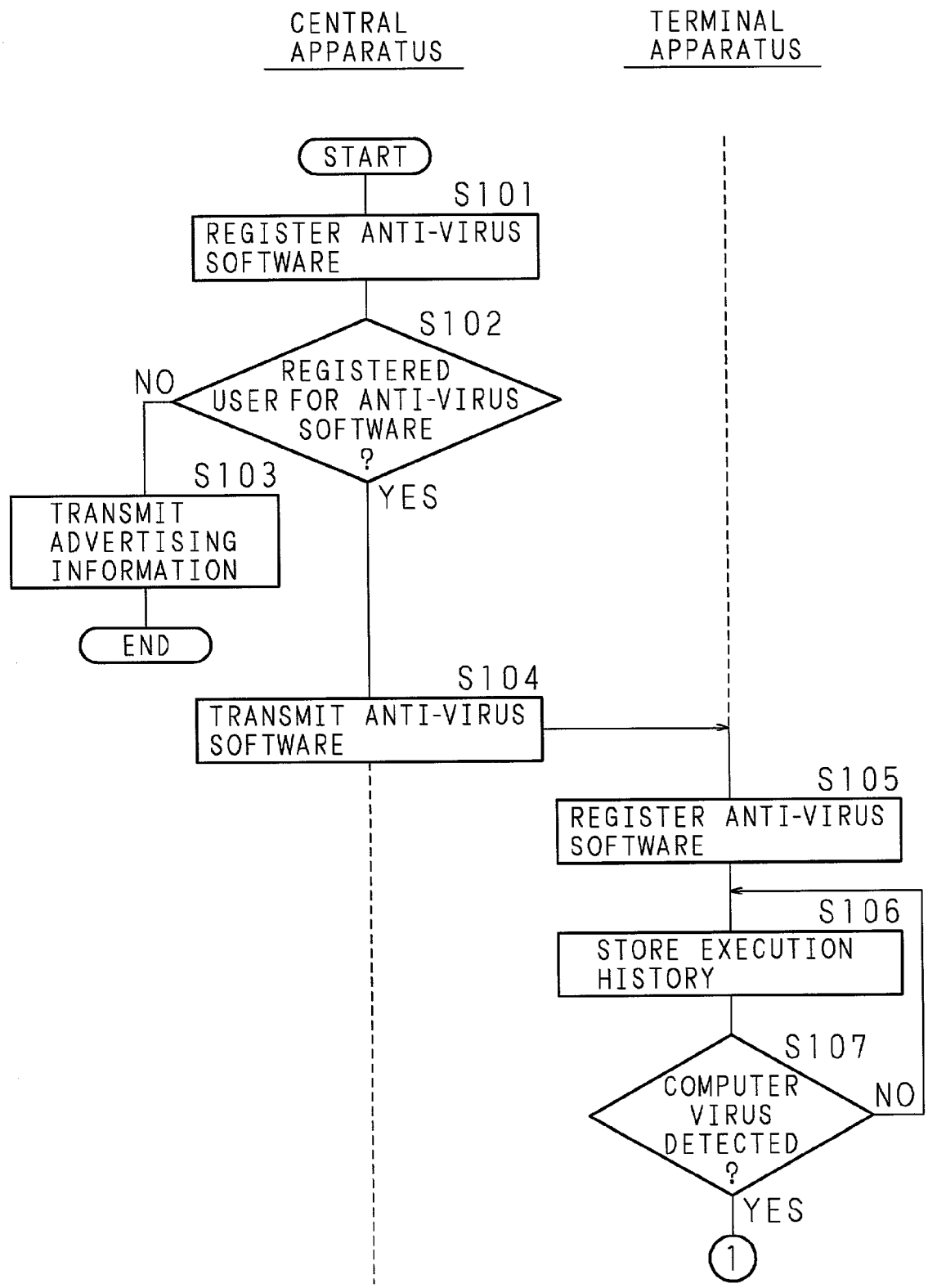
FIG. 12A and B are flow chart showing the process sequence of a computer virus infection information providing system according to Embodiment 2.
Figure 12B:
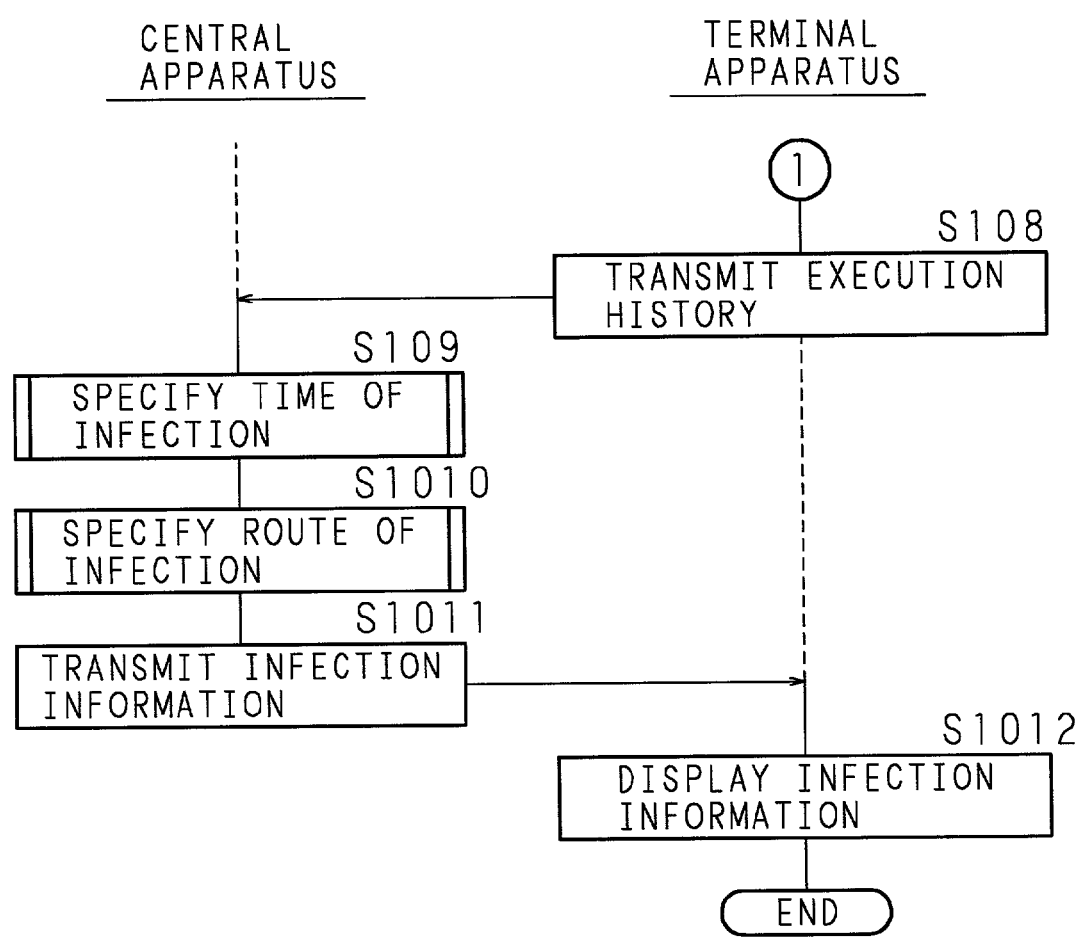

FIG. 12A and B are flow chart showing the process sequence of the computer virus infection information providing system according to Embodiment 2. Similarly to Embodiment 1, central apparatus 1 installs anti-virus software against a new computer virus on anti-virus software installation file 151 (step S101). Then, central apparatus 1 determines whether a user is a registered user for the anti-virus software or not with reference to user file 153 (step S102). When central apparatus 1 has determined that the user is a registered user for the anti-virus software (YES in step S102), central apparatus 1 transmits the anti-virus software to the terminal apparatus 2 owned by the registered user, with reference to the e-mail address (step S104).

When central apparatus 1 has determined that the user is not a registered user for the anti-virus software (NO in step S102), central apparatus 1 transmits the advertising information concerning the anti-virus software to terminal apparatus 2 (step S103). The advertising information is an e-mail stating that the anti-virus software is available at a predetermined cost. Here, central apparatus 1 transmits the advertising information to the e-mail address of each user not yet registered for the anti-virus software with reference to user file 153.

FIG. 13 is a diagram showing an illustration of the advertising information. The advertising information shown in the figure is transmitted. Further, as shown in the figure, central apparatus 1 transmits a hyperlink to jump to a Web page for the anti-virus software registration. By virtue of this system, the users not yet registered for the anti-virus software are informed, whereby the number of registered users for the anti-virus software can be increased.

Terminal apparatus 2 received the anti-virus software installs the anti-virus software on storage section 25 (step S105). Every time of execution of the anti-virus software, terminal apparatus 2 stores the execution history into execution history file 251 (step S106). When terminal apparatus 2 executes the anti-virus software, terminal apparatus 2 determines whether a computer virus is detected or not (step S107). When a computer virus is detected (YES in step S107), terminal apparatus 2 reads out the execution history from execution history file 251. Terminal apparatus 2 transmits the execution history to central apparatus 1 (step S108). In contrast, when no computer virus is detected (NO in step S107), terminal apparatus 2 proceeds to step S106, thereby repeating the process. The process steps S105-S108 are described later in detail.

Central apparatus 1 received the execution history specifies the time of infection (step S109), and further specifies the route of infection (step S1010). Detail of these process steps are described later. Central apparatus 1 transmits the infection information including the time and route of infection, the detected computer virus name, and the method of treatment, to terminal apparatus 2 (step S1011). Terminal apparatus 2 displays the transmitted infection information onto display section 24 (step S1012).

FIG. 14 is a diagram showing the contents of infection information displayed on display section 24. As shown in FIG. 14, the infection information such as the time and route of infection is displayed on display section 24.

Figure 15A:
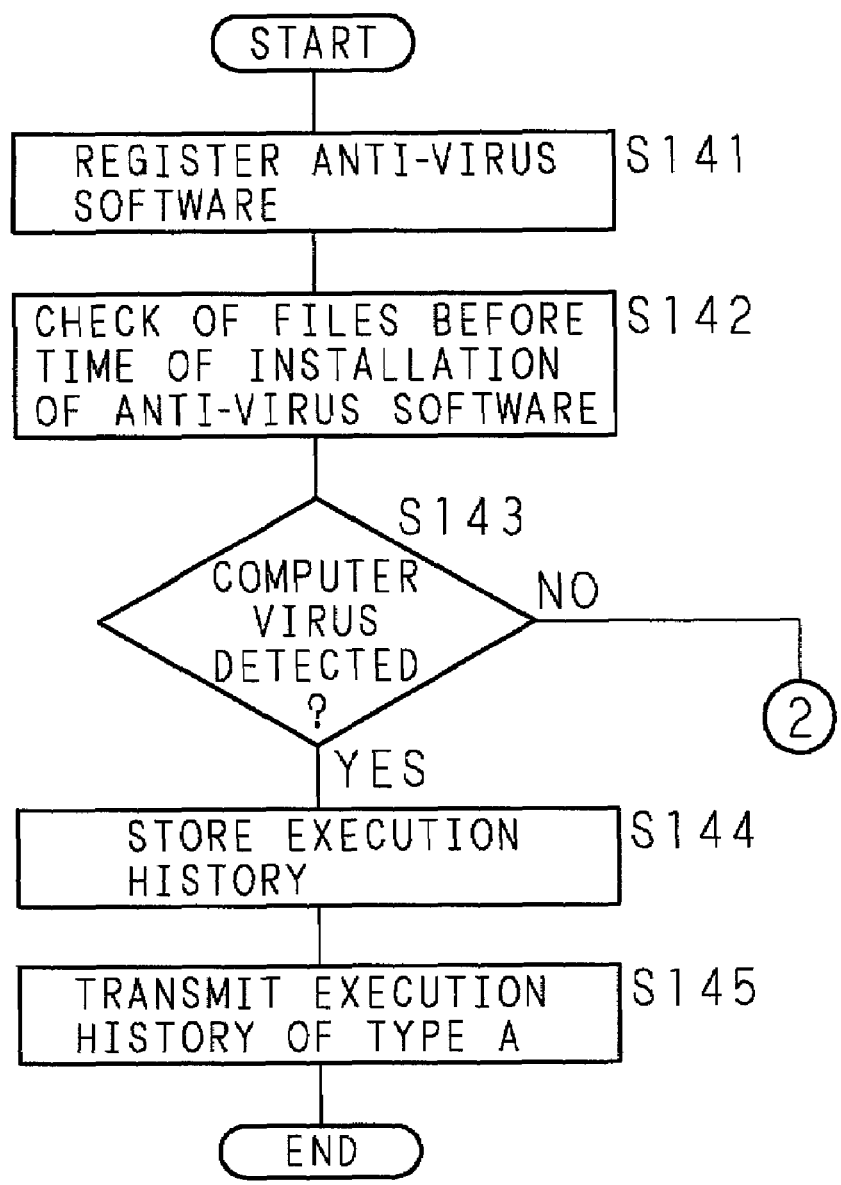
FIG. 15A and B are flow chart showing the process sequence of virus check in a terminal apparatus.
Figure 15B:
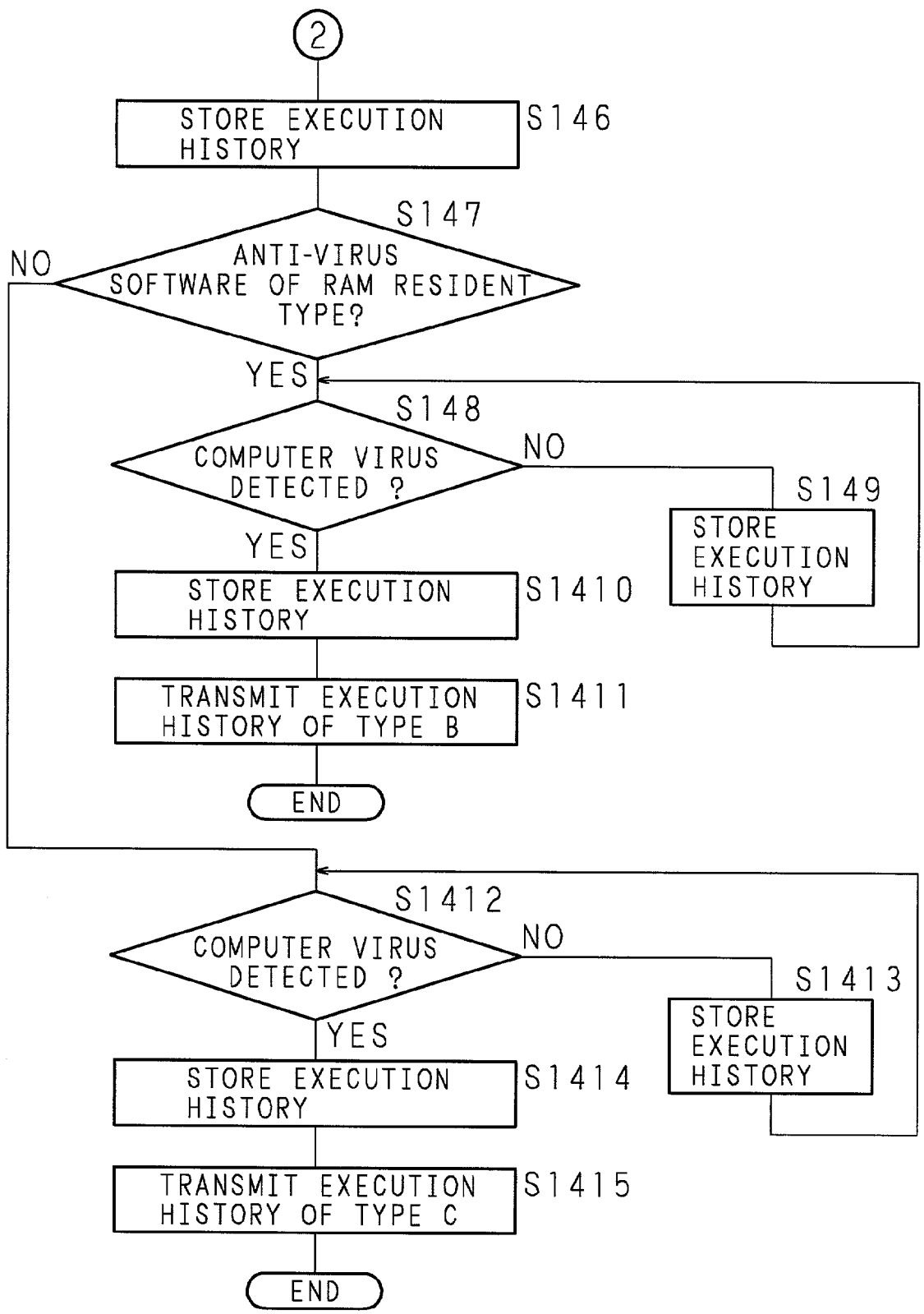

FIG. 15A and B are flow chart showing the process sequence of virus check in terminal apparatus 2. Terminal apparatus 2 installs the anti-virus software transmitted from the central apparatus 1, on the storage section 25 (step S141). The terminal apparatus 2 further stores the time of installation. Terminal apparatus 2 then starts and executes the installed anti-virus software, thereby checking the files made before the time of installation (step S142). More specifically, terminal apparatus 2 performs scan and pattern matching onto the files stored in storage section 25. Terminal apparatus 2 determines whether a computer virus is detected or not (step S143). When a computer virus is detected (YES in step S143), terminal apparatus 2 stores the execution history into execution history file 251 (step S144). After that, terminal apparatus 2 reads out the stored execution history, thereby transmitting execution history of type A to central apparatus 1 (step S145). The transmitted information includes: the address of terminal apparatus 2; the time of execution of the anti-virus software; the file name of the detected computer virus; the time of update of the file; and the execution history type (any one of type A to type C).

In contrast, when no computer virus is detected (NO in step S143), terminal apparatus 2 stores the execution history into execution history file 251 (step S146). After that, terminal apparatus 2 determines whether the anti-virus software is of a RAM resident type or not (step S147). That is, there are two types of anti-virus software. One type is a RAM resident type which resides in RAM 22, thereby checking computer viruses every time of file operation, while the other type is a RAM non-resident type which is executed every time interval (for example, every 5 hours). Since the specification of the time of infection depends on the these types, terminal apparatus 2 caries out the following steps.

When the anti-virus software is of RAM resident type (YES in step S147), terminal apparatus 2 executes the anti-virus software every time of file operation. Terminal apparatus 2 determines whether a computer virus is detected or not (step S148). When no computer virus is detected (NO in step S148), terminal apparatus 2 stores the execution history into execution history file 251 (step S149). After that, terminal apparatus 2 proceeds to step S148, thereby repeating the process. In contrast, when a computer virus is detected (YES in step S148), terminal apparatus 2 stores the execution history into execution history file 251 (step S1410). After that, terminal apparatus 2 reads out the stored execution history, thereby transmitting execution history of type B to central apparatus 1 (step S1411).

On the other hand, when the anti-virus software is of RAM non-resident type (NO in step S147), terminal apparatus 2 checks computer viruses every predetermined time interval. Terminal apparatus 2 determines whether a computer virus is detected or not (step S1412). When no computer virus is detected (NO in step S1412), terminal apparatus 2 stores the execution history into execution history file 251 (step S1413). After that, terminal apparatus 2 proceeds to step S1412, thereby repeating the process. In contrast, when a computer virus is detected (YES in step S1412), terminal apparatus 2 stores the execution history into execution history file 251 (step S1414). After that, terminal apparatus 2 reads out the stored execution history, thereby transmitting execution history of type C to central apparatus 1 (step S1415).

Figure 16:
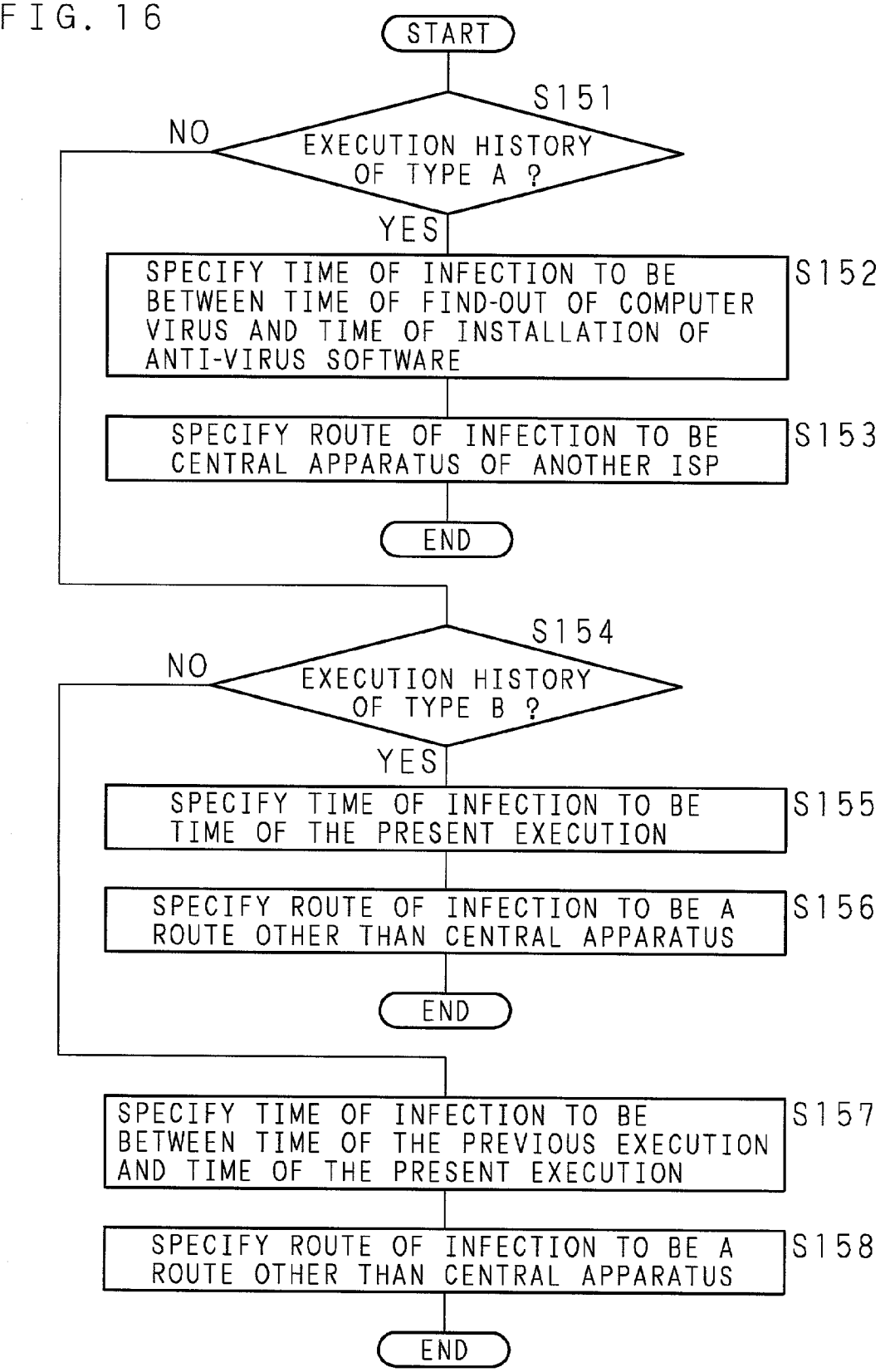
FIG. 16 is a flow chart showing the process sequence of specifying the time and route of infection.

FIG. 16 is a flow chart showing the process sequence of specifying the time and route of infection. The process according to the invention is branching into the following sub-processes depending on the execution history of types A to C transmitted from terminal apparatus 2. First, central apparatus 1 determines whether the transmitted execution history is of type A or not (step S151). When the execution history is of type A (YES in step S151), central apparatus 1 specifies the time of infection to be between the time of find-out of the computer virus and the time of installation of the anti-virus software into terminal apparatus 2 (step S152). Further, central apparatus 1 specifies the route of infection to be a route via central apparatus 1, another ISP, or a computer memory product (step S153). That is, the infection has occurred before the installation of the anti-virus software into terminal apparatus 2. Accordingly, the time of infection is specified to be before the installation of the anti-virus software into terminal apparatus 2. Further, the possibility can not be rejected that the infection has occurred via the ISP which owns central apparatus 1.

When the execution history is not of type A (NO in step S151), central apparatus 1 determines whether the transmitted execution history is of type B or not (step S154). When the execution history is of type B (YES in step S154), that is, when the anti-virus software is of RAM resident type, central apparatus 1 specifies the time of infection to be the time when the anti-virus software is executed at the present time (step S155). That is, the anti-virus software of RAM resident type checks computer viruses at each time of file operation in real time, thereby specifies the time of infection completely.

Further, central apparatus 1 specifies the route of infection to be a route via another ISP other than central apparatus 1, or via a computer memory product (step S156). That is, in step S143, no computer virus was present before the installation of the anti-virus software into terminal apparatus 2. Further, a computer virus is detected after the installation of the anti-virus software. Accordingly, the route of infection is specified to be a route via another ISP other than central apparatus 1, or via a computer memory product.

When the execution history is not of type B (NO in step S154), that is, when the anti-virus software is of RAM non-resident type (type c), central apparatus 1 specifies the time of infection to be between the time when the anti-virus software is executed at the previous time and the time when the anti-virus software is executed at the present time (step S157). That is, the anti-virus software of RAM non-resident type checks computer viruses every predetermined time interval. Accordingly, with reference to the execution history, the time of infection is specified to be between the time of the previous execution and the time of the present execution.

Further, central apparatus 1 specifies the route of infection to be a route via another ISP other than central apparatus 1, or via a computer memory product (step S158). That is, in step S143, no computer virus was present before the installation of the anti-virus software into terminal apparatus 2. Further, a computer virus is detected after the installation of the anti-virus software. Accordingly, the route of infection is specified to be a route via another ISP other than central apparatus 1, or via a computer memory product.

Embodiment 3

Figure 17:
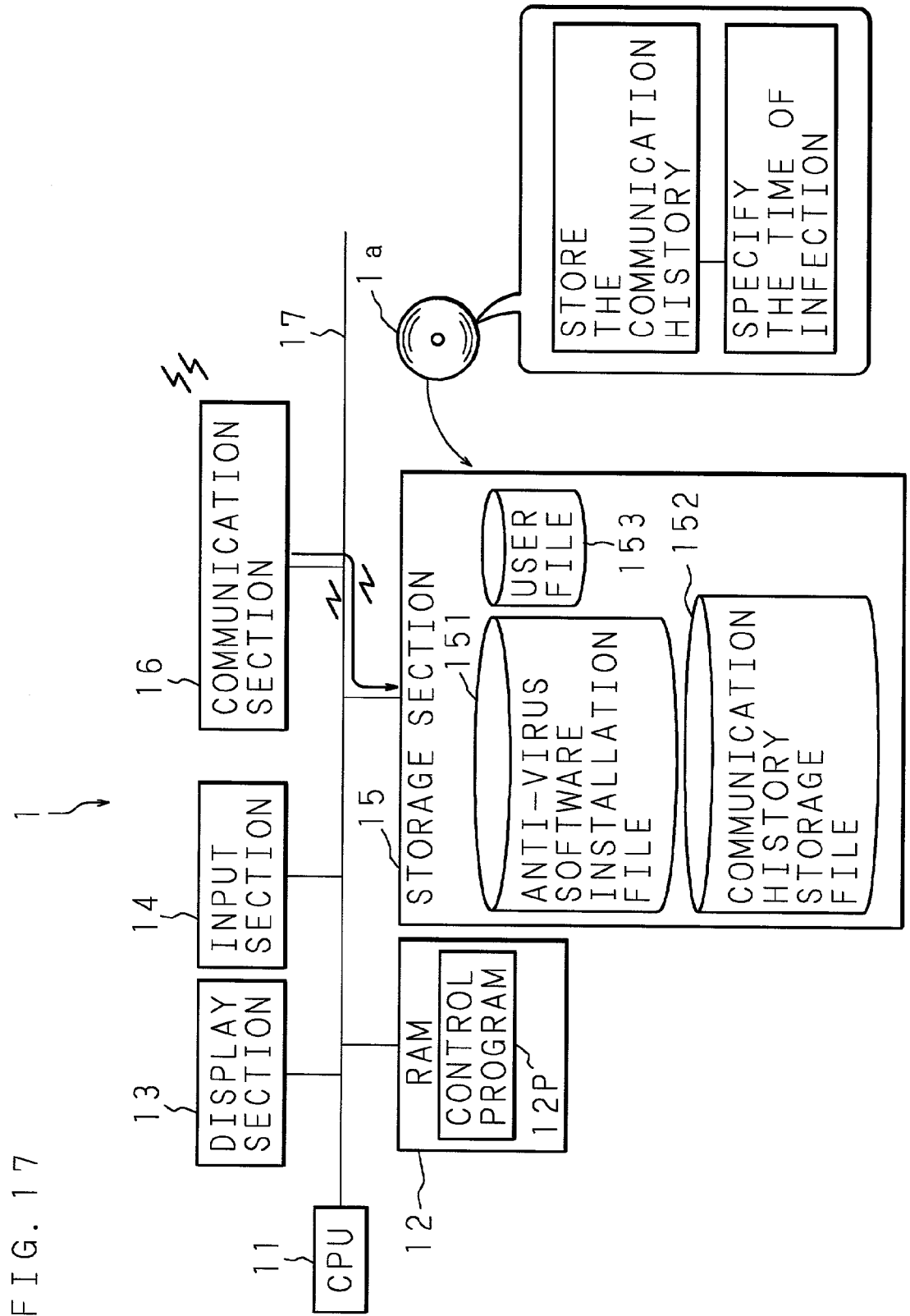
FIG. 17 is a schematic diagram showing a general configuration according to Embodiment 3 of to the invention.

FIG. 17 is a schematic diagram showing a general configuration according to Embodiment 3 of the invention. As shown in Embodiment 3, the computer program for causing central apparatus 1 according to Embodiments 1 and 2 to execute can be distributed in a manner in which the computer program is pre-installed in central apparatus 1, or alternatively in a form of a portable computer memory product such as a CD-ROM and an MO. Further, the computer program can be distributed by being propagated as a carrier wave via a network. The contents are described below.

A computer memory product 1a (a CD-ROM, an MO, a DVD-ROM, or the like) having recorded a computer program for causing a central apparatus 1 shown in FIG. 17 to store the communication history and thereby to specify the time of infection is installed in a storage section 15 of the central apparatus 1. The computer program is loaded up to a RAM 12 of the central apparatus 1, thereby being executed. By virtue of this, the computer program serves as the above-mentioned central apparatus 1 according to the invention.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalent of such metes and bounds thereof are therefore intended to me embraced by the claims.

The invention claimed is:

1. A computer virus infection information providing method for detecting a computer virus in information transmitted between a terminal apparatus and a central apparatus and providing infection information concerning the detected computer virus, the method comprising:

installing anti-virus software on the central apparatus;

storing a communication history of the terminal apparatus;

registering a time of find-out, which is a time when the computer virus was found out;

specifying a time of infection of the terminal apparatus based on the stored communication history, the registered time of find-out, and a time of installation of the anti-virus software, in response to detection, by the installed anti-virus software, of the computer virus in information transmitted from the terminal apparatus to the central apparatus;

specifying a route of infection of the computer virus based on the stored communication history and the time of installation of the anti-virus software;

transmitting the infection information, including the specified time of infection and the specified route of infection, from the central apparatus to the terminal apparatus; and displaying the transmitted infection information by using the terminal apparatus.

2. A computer virus infection information providing system for detecting a computer virus and providing infection information concerning the detected computer virus, comprising:

a central apparatus; and a terminal apparatus connected to the central apparatus via a communication network; wherein the central apparatus includes a processor capable of performing operations of:

installing anti-virus software;

storing a communication history of the terminal apparatus;

registering a time of find-out, which is a time when the computer virus was found out;

specifying a time of infection of the terminal apparatus based on the stored communication history, the registered time of find-out, and a time of installation of the anti-virus software, in response to detection, by the installed anti-virus software, of a computer virus in received information transmitted from the terminal apparatus;

specifying a route of infection of the computer virus based on the stored communication history and the time of installation of the anti-virus software; and transmitting the infection information, including the specified time of infection and the specified route of infection, to the terminal apparatus, and wherein the terminal apparatus includes a processor capable of performing the operation of displaying the transmitted infection information.

3. A computer virus infection information providing system according to claim 2, wherein the processor of the central apparatus is further capable of performing an operation of transmitting the installed anti-virus software to a predetermined terminal apparatus, wherein the processor of the terminal apparatus is further capable of performing operations of:

installing the transmitted anti-virus software;

storing an execution history of the installed anti-virus software; and transmitting the stored execution history to the central apparatus when a computer virus is detected by the anti-virus software, and wherein the processor of the central apparatus is further capable of performing the operations of:

specifying the time of infection based on the transmitted execution history and the registered time of find-out;

specifying the route of infection of the computer virus based on the transmitted execution history; and transmitting the infection information including the specified time of infection and the specified route of infection, to the terminal apparatus.

4. A computer virus infection information providing system according to claim 2, wherein the processor of the central apparatus is further capable of performing an operation of transmitting advertising information concerning the anti-virus software to the terminal apparatus when a computer virus is detected by the anti-virus software.

5. An infection information providing system apparatus for detecting a computer virus in transmitted and received information and providing infection information concerning the detected computer virus, comprising a processor capable of performing operations of:

installing anti-virus software on a central apparatus;

storing communication history of the information of a terminal apparatus;

registering a time of find-out, which is a time when the computer virus was found out;

specifying a time of infection of the terminal apparatus based on the stored communication history, the registered time of find-out, and a time of installation of the anti-virus software, in response to detection, by the installed anti-virus software, of the computer virus in received information;

specifying a route of infection of the computer virus based on the stored communication history and the time of installation of the anti-virus software; and transmitting the infection information, including the specified time of infection and the specified route of infection, to the terminal apparatus.

6. A computer memory product readable by a computer and storing a computer program used by a central apparatus for detecting a computer virus in transmitted and received information between the central apparatus and a terminal apparatus and providing infection information concerning the detected computer virus, the computer program comprising the steps of:

storing a communication history of the terminal apparatus;

registering a time of find-out, which is a time when the computer virus was found out;

specifying a time of infection of the terminal apparatus based on the stored communication history, the registered time of find-out, and a time of installation of anti-virus software on the central apparatus, in response to detection, by the anti-virus software, of the computer virus in received information;

specifying a route of infection of the computer virus based on the stored communication history and the time of installation of the anti-virus software; and transmitting the infection information, including the specified time of infection and the specified route of infection, from the central apparatus to the terminal apparatus.

7. A computer virus infection information providing system for detecting a computer virus and providing infection information concerning the detected computer virus, comprising:
a central apparatus; and
a terminal apparatus connected to the central apparatus via a communication network; wherein the central apparatus includes:
means for installing anti-virus software;
means for storing a communication history of the terminal apparatus;
means for registering a time of find-out, which is a time when the computer virus was found out;
means for specifying a time of infection of the terminal apparatus based on the stored communication history, the registered time of find-out, and a time of installation of the anti-virus software, in response to detection, by the installed anti-virus software, of a computer virus in information transmitted from the terminal apparatus to the central apparatus;
means for specifying a route of infection of the computer virus based on the stored communication history and the time of installation of the anti-virus software; and
means for transmitting the infection information, including the specified time of infection and the specified route of infection, to the terminal apparatus; wherein the terminal apparatus includes
means for displaying the transmitted infection information.

8. An infection information providing apparatus for detecting a computer virus in information transmitted to and received from the outside and providing infection information concerning the detected computer virus, comprising:
means for installing anti-virus software on a central apparatus;
means for storing a communication history of the information of a terminal apparatus;
means for registering a time of find-out, which is a time when the computer virus was found out;
means for specifying a time of infection of the terminal apparatus, based on the stored communication history, the registered time of find-out, and a time of installation of the anti-virus software, in response to detection, by the installed anti-virus software, of a computer virus in the information received from the outside;
means for specifying a route of infection of the computer virus based on the stored communication history and the time of installation of the anti-virus software; and
means for transmitting the infection information, including the specified time of infection and the specified route of infection, to the terminal apparatus.

9. A computer virus infection information providing method for detecting a computer virus in information transmitted between a client and a server and providing infection information concerning the detected computer virus, comprising:
installing anti-virus software on the server apparatus;
detecting the virus and specifying a time of detection;
storing a communication history of the client apparatus;
specifying a time of infection based on the time of detection, a time of installing the anti-virus software, and the stored communication history when the virus is detected by the installed anti-virus software;
specifying a route of infection of the computer virus based on the stored communication history and the time of installing the anti-virus software;
transmitting the infection information, including the specified time of infection and the specified route of infection, from the server to the client; and
displaying the transmitted infection information at the client.

* * * * *